United States Patent
Andaker et al.

(10) Patent No.: US 7,106,725 B2
(45) Date of Patent: Sep. 12, 2006

(54) INTEGRATION OF VOICE AND DATA CHANNELS

(75) Inventors: Kristian L. M. Andaker, Bellevue, WA (US); William H. Gates, III, Redmond, WA (US); Max G. Morris, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 10/138,472

(22) Filed: May 3, 2002

(65) Prior Publication Data

US 2003/0208358 A1 Nov. 6, 2003

(51) Int. Cl.
*H04L 12/66* (2006.01)
(52) U.S. Cl. .................. 370/352; 370/401; 370/433
(58) Field of Classification Search .................. None
See application file for complete search history.

(56) References Cited

U.S. PATENT DOCUMENTS

| | | | | |
|---|---|---|---|---|
| 6,754,711 B1* | 6/2004 | Dodrill et al. | ............... | 709/227 |
| 6,883,015 B1* | 4/2005 | Geen et al. | ............... | 709/203 |
| 6,910,074 B1* | 6/2005 | Amin et al. | ............... | 709/227 |
| 7,032,017 B1* | 4/2006 | Chow et al. | ............... | 709/223 |
| 2003/0041108 A1* | 2/2003 | Henrick et al. | ............. | 709/205 |

FOREIGN PATENT DOCUMENTS

EP 0 869 688 A2 7/1998

* cited by examiner

*Primary Examiner*—Doris H. To
*Assistant Examiner*—Phuongchau Ba Nguyen
(74) *Attorney, Agent, or Firm*—Workman Nydegger

(57) ABSTRACT

Integrated voice and data channel communications. Browsing and source computing devices establish a first data channel. The browser transmits its data address to the source. The source then correlates that data address to a browse session identifier that may be dialed using a telephone keypad. The source then transmits a calling mechanism along with the browse session identifier to the browser. Upon selection of the calling mechanism at the browser, a voice call is placed using the telephone number supplied with the calling mechanism. Once the voice channel is established, the appended browse session identifier is dialed. The source may use the browse session identifier to correlate the voice call to the browser's data address. The source then establishes another data channel with the browsing computing device. Then, the source may transmit update information to the browser that relates to a concurrent voice conversation.

28 Claims, 4 Drawing Sheets

INTEGRATION OF VOICE AND DATA CHANNELS

BACKGROUND OF THE INVENTION

1. The Field of the Invention

The present invention relates to the field of computer networks. In particular, the present invention relates to methods, systems, and computer program products for integrating voice and data channels to allow simultaneous use of both channels to converse regarding, for example, a common topic.

2. Background and Related Art

Effective communication and access to information are recognized as being essential to the advancement of humankind. Two technologies that have greatly contributed to our ability to communicate are the telephone and the computer. Until more recently, telephones had been exclusively used to communicate voice information over voice channels, while computer networks have been exclusively used to communicate data (e.g., Web pages, e-mails, and the like) over data channels.

More recently, however, telephones have been used to communicate over both voice and data channels. For example, there are currently many Internet-enabled mobile telephones currently in the marketplace. One may now use such telephones to communicate over voice channels by, for example, calling a friend, or to communicate over data channels by, for example, browsing the Web or sending or receiving e-mails.

Similarly, many computers such as Personal Digital Assistants (PDAs), laptop computers, or desktop computers, may be used not only to browse the Web or send or receive e-mails, but also to place a telephone call. Accordingly, telephones are becoming more like multi-purpose computers with telephone capability, while computers are integrating telephones with computer networking capability. Now, the difference between a PDA and a modem advanced telephone is primarily the physical form of the device.

Recently, there have been some attempts to "integrate" the voice and data capabilities of these devices, by having voice channels that communicate information that relates to the information communicated on the data channel. One form of such integration will be referred to herein as "data-to-voice". In data-to-voice, one first uses a data channel (e.g., an Internet Protocol or IP connection) to navigate to a Web resource that includes a call link. Then, the user may select the call link, which results in a telephone call being placed over a voice channel to a designated callee. Accordingly, if one has interest in an item on a Web page, one may be prompted to select the call link to verbally consult with an information source further regarding the content of the Web page.

Data-to-voice technology is useful because it allows a browsing user to easily place a telephone call by simply selecting a link from a Web page. There is no need to look up a telephone number or otherwise search for an information source regarding the content of that Web page. Accordingly, data-to-voice technology allows for a relatively seamless transition from a data connection to a voice connection. However, in conventional data-to-voice technology, the display of the browser does not change during the telephone conversation absent input by the browsing user. The callee (i.e., the call party that receives the telephone call) cannot, for example, update the caller's browser so that the caller can view more information regarding the telephone conversation. Likewise, the caller cannot update the callee's browser.

One conventional technology that does allow a callee to update a browser viewable by a caller will be referred to herein as "voice-to-data" technology. This technology is initiated via a telephone call. At some point during the call, the callee and the caller establish a data connection. The callee then issues instructions to the caller's browser to update with information germane to the telephone conversation.

The voice-to-data technology thus allows for individuals involved in a telephone conversation to have more in depth communication exchange with the assistance of a data channel. However, in order for the callee and caller to establish a data connection between their associated computing devices, they need to identify each other's data channel addresses. Also, in order to provide for some degree of security, the caller and callee's device would have to negotiate an update key that would allow the callee to update the display of the caller's browser.

Accordingly, what is desired are methods, systems, and computer program products that allow a caller and callee to engage in a voice channel communication and a data channel communication while making it easier to identify each others' data channel addresses, and set up an update key.

SUMMARY OF THE INVENTION

The present invention extends to methods, systems and computer program products for conducting an integrated voice/data communication between a browsing computing device and a source computing device. First, the browsing and source computing devices established a data connection using, for example, HyperText Transport Protocol (HTTP), Transmission Control Protocol/Internet Protocol (TCP/IP), User Datagram Protocol (UDP) or the like. During the normal course of establishing a connection, the source computing device is transmitted the data address (e.g., an IP or Web address) of the browsing computing device. The source computing device then correlates that data address to a browse session identifier that may be dialed using a telephone keypad.

The source computing device then transmits a calling mechanism to the browsing computing device that allows the browsing computing device to establish a voice channel with an entity (e.g., an operator, customer service, or sales agent) associated with the source computing device. For example, HyperText Markup Language (HTML) documents have provisions for a hypertext link that may reference a telephone number. When the hypertext link is selected, a telephone call is placed by the browsing computing device automatically dialing the number referenced by the hypertext link.

Upon selection of the mechanism, a voice connection is established. When establishing the voice connection, enough information is transmitted to the source computing device that the source computing device may establish a subsequent data connection with the browsing computing device and correlate that subsequent data connection with the voice connection. For example, when providing the call hypertext link to the browsing computing system, the source computing system may have appended the browse session identifier to the end of the telephone number. Accordingly, when the user of the browsing computing device selects the call hypertext link, not only is the telephone number called, but the corresponding identifier is dialed as well once the voice channel is established. In some networks, appending the browse session identifier to the telephone number may be insufficient to guarantee that the browse session identifier will be dialed after the voice channel is established. In those networks, the browsing computing device may first dial the telephone number, wait for a dial tone, and then dial the browse session identifier using DTMF tones.

The source computing device may use the browse session identifier to correlate the voice call to a data address. The source computing device then establishes another data channel with the browsing computing device. Then, the source computing device may transmit browser update information that relates to a voice conversation concurrently occurring over the voice channel. In order to authorize the source computing device to update the browser on the browsing computing device, the source computing device may have transmitted an update key to the browsing computing device along with the calling mechanism. Then, when the second data channel is established, the source computing device may transmit the same update key to the browsing computing device along with the information that will be used to update the display of the browser. Then, the browsing computing device may match the update key to the update key provided with the calling mechanism to authorize the display to be updated.

There have been attempts to make the voice and data channel more interactive and automated. For example, using the "data-to-voice" technology described above, a user may browse to a Web site, and then activate a "call" icon using the browser to initiate a telephone conversation with an entity associated with the Web site. There is also "voice-to-data" technology in which one of the parties to a telephone conversation may update the browser of the other party via a subsequently established data connection.

The voice-to-data technology suffers from the more than trivial problem of establishing a correlation between the voice and subsequently established data channel. Such correlation might typical involve the source computing device querying the telephonic device associated with the browsing computing device (or a global database) for a corresponding data address of the browsing computing device. Furthermore, such correlation may not be possible in all cases should there be no such global database available, or if there is no mechanism for querying the telephone device. Furthermore, even if such correlation were possible, the correlation may require some time to communicate with any components that store the corresponding data address of the telephonic device.

In accordance with the principles of the present invention, a "data-voice-data" technology is introduced. This technology goes further than the data-to-voice technology as it allows for at least one of the participants in the voice conversation to update the browser of the other participant via a subsequently established data connection. Furthermore, the correlation between the voice conversation and the subsequently established data connection is efficiently established using information exchanged over a previous data connection, thereby more efficiently making the correlation between the voice channel and the subsequently established data channel as compared to conventional "voice-to-data" technology.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
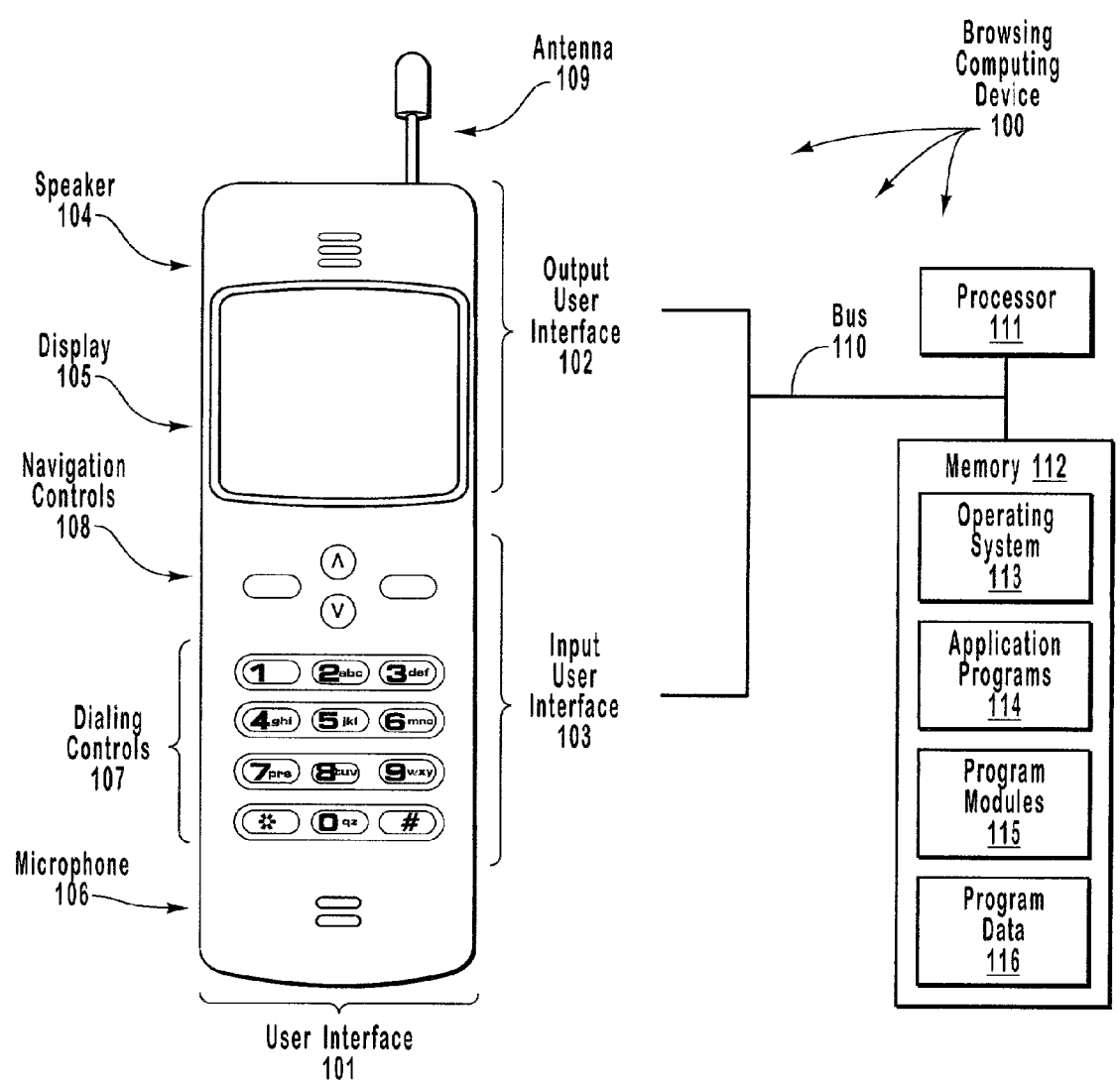
FIG. 1 illustrates an example browsing computing device that may be used to help integrate a voice channel and a data channel in accordance with the present invention.

The present invention extends to methods, systems and computer program products for conducting an integrated voice/data communication between a browsing computing device and a source computing device. First, the browsing and source computing devices establish a data channel. Then, a voice channel is automatically established using a mechanism provided in the data channel. Subsequently, a second data channel is automatically established using information provided in the voice channel. This allows information to be concurrently exchanged concerning a desired subject using both the voice channel and the second data channel.

Embodiments within the scope of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates a browsing computing device 100 that represents a suitable operating environment for the present invention. The browsing computing device 100 includes a user interface 101 for allowing a user to review information presented via an output user interface 102, and to input information through an input user interface 103. For example, the output user interface 102 includes a speaker 104 for presenting audio information to the user, as well as a display 105 for presenting visual information such as a browser window to the user. The browsing computing device 100 also has an antenna 109 for wireless communication with other devices and/or networks.

The input user interface 103 may include a microphone 106 for rendering audio information into electronic form. In addition, the input user interface 103 includes dialing controls 107 represented by 12 buttons through which a user may dial a telephone number, enter a text message, or instruct the browsing computing device 100 to send a data message. Input user interface 103 also includes navigation control buttons 108 that assist the user in navigating through various entries and options that may be listed on display 105.

Although the browsing computing device 100 has the appearance of a mobile telephone, the unseen features of the browsing computing device 100 may allow for complex and flexible general-purpose processing capabilities. For example, the browsing computing device 100 also includes a processor 111 and a memory 112 that are connected to each other and to the user interface 101 via a bus 110. The memory 112 generically represents a wide variety of volatile and/or non-volatile memories that may be employed. The particular type of memory used in the browsing computing device 100 is not important to the present invention.

Program code means comprising one or more program modules may be stored in memory 112. The one of more program modules may include an operating system 113, one or more application programs 114, other program modules 115, and program data 116. The environment illustrated in FIG. 1 is illustrative only, and by no means represents even a small portion of the wide variety of browsing computing devices in which the principles of the present invention may be implemented. For example, the browsing computing device that may implement the features of the present invention may include PDA's, laptop computers, desktop computers, or any other computer, device, or network that may establish both a voice and data channel.

In this description and in the claims, a "computing device" comprises any computer or device or any network of computer(s) and/or device(s) that is capable of processing information in response to executable-instructions. A "browsing computing device" is any computing device that can execute a browser. A "browser" is any software or hardware or combination of software or hardware that facilitates navigation to a network site such that content from a network site may be displayed on the browsing computing device. A "source computing device" is any computing device that is capable of downloading content to a browsing computing device. A browsing computing device may also be a source computing device, and vice versa.

Figure 2:
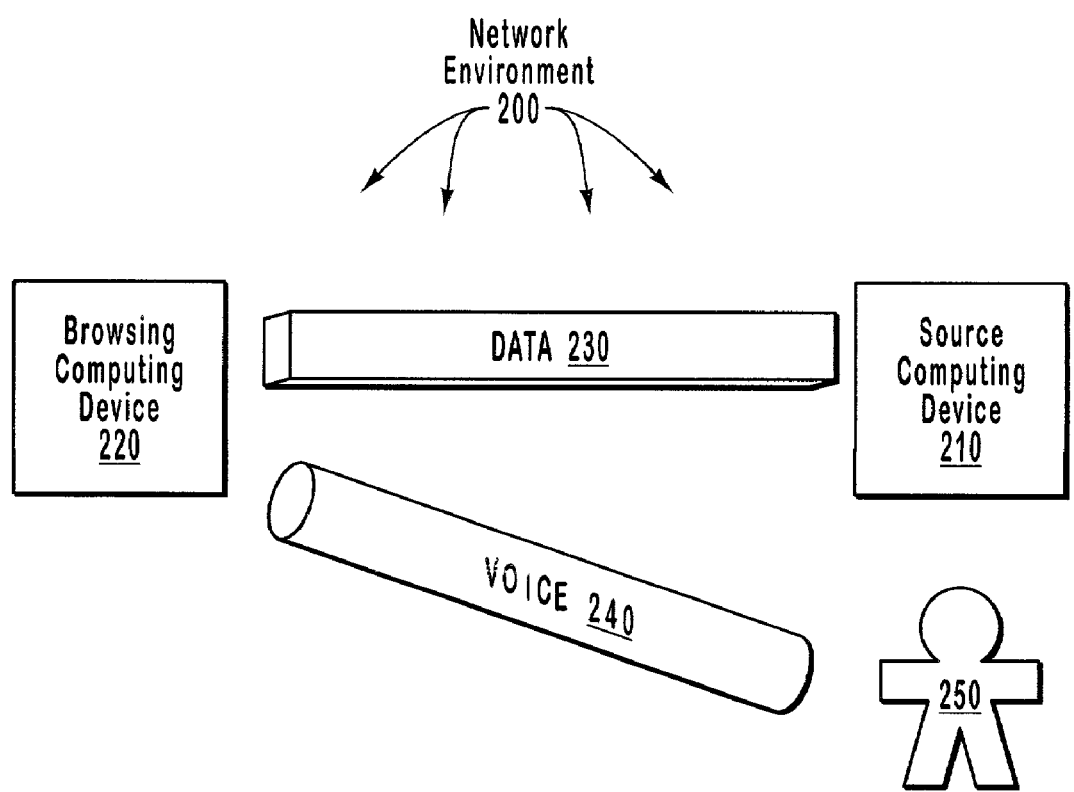
FIG. 2 illustrates an example network environment that represents a suitable network environment for the principles of the present invention.

FIG. 2 illustrates an example network environment 200 that represents a suitable network environment for the principles of the present invention. The network environment 200 includes a source computing device 210 and a browsing computing device 220 that may be, for example, the browsing computing device 100 illustrated in FIG. 1. The browsing computing device 220 may include a browser application that may be one of the application programs 114 of FIG. 1.

The source computing device 210 and the browsing computing device 220 have the capability to establish and communicate data over one or more data connections. This capability is represented by a pipe having a square cross-section and labeled "data 230". The browsing computing device 220 is also capable of establishing a voice connection with the source computing device 210 or with an entity 250 associated with the source computing device 210. Such an entity may be, for example, any biological or computational entity that is capable of engaging in at least one-way, but preferably two-way, dialog. Such entities include, for example, a telephone or telephone-enabled computer interfacing with a human being. The capability of establishing a voice connection is represented in FIG. 2 by a circular pipe labeled "voice 240". The entity associated with the source computing device may also be an artificial intelligence component that is capable of at least approximately simulating human conversation. In this description and in the claims, an "entity associated with the source computing device" may include the source computing device itself.

Many consumer computing devices such as Internet-enabled telephones, and voice-enabled PDA's currently have the ability to establish a data connection and a voice connection simultaneously. However, often the information exchanged over the voice connection is wholly unrelated to the information exchanged over the data connection. In other cases, the information is related, but only due to user effort. For example, a user may browse to a Web site, and then call a number listed on the Web site to ask questions.

There have been attempts to make the voice and data channel more interactive and automated. For example, using the "data-to-voice" technology described above, a user may browse to a Web site, and then activate a "call" icon using the browser to initiate a telephone conversation with an entity associated with the Web site. There is also "voice-to-data" technology in which one of the parties to a telephone conversation may update the browser of the other party via a subsequently established data connection.

However, the voice-to-data technology suffers from the more than trivial problem of establishing a correlation between the voice and subsequently established data channel. Such correlation might typical involve the source computing device querying the telephonic device associated with the browsing computing device (or a global database) for a corresponding data address of the browsing computing device. Furthermore, such correlation may not be possible in all cases should there be no such global database available, or if there is no mechanism for querying the telephone device.

In accordance with the principles of the present invention, a "data-voice-data" technology is introduced. This technology goes further than the data-to-voice technology as it allows for at least one of the participants in the voice conversation to update the browser of the other participant via a subsequently established data connection. Furthermore, the correlation between the voice conversation and the subsequently established data connection is efficiently established using information exchanged over a previous data connection, thereby more efficiently making the correlation between the voice and subsequently established data connection as compared to conventional "voice-to-data" technology.

Figure 3:
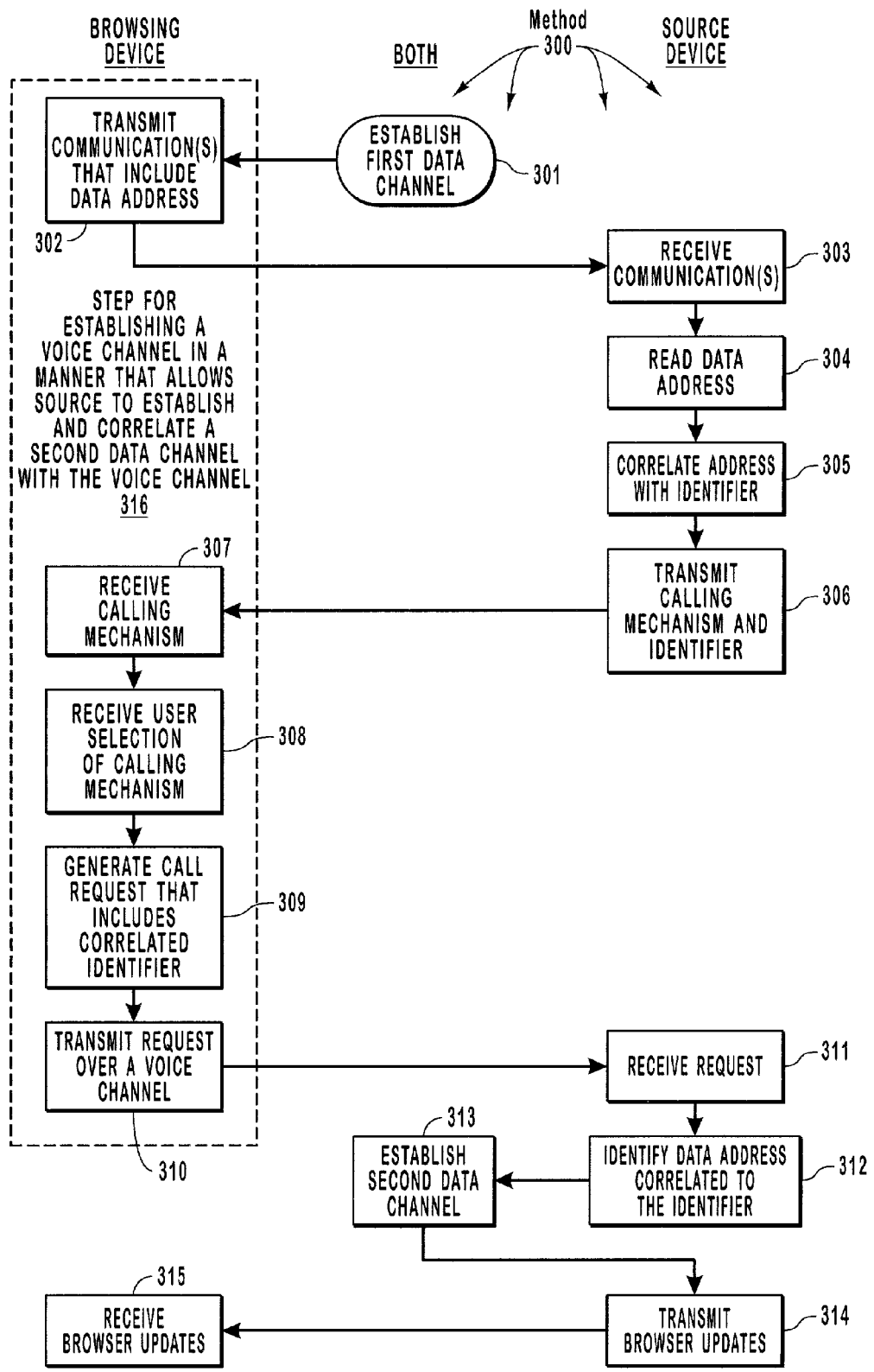
FIG. 3 is a flowchart of a method for facilitating integrated voice/data communication in accordance with the present invention.

FIG. 3 is a flowchart of a method 300 for facilitating integrated voice/data communication in accordance with the present invention. Some acts are performed by the browsing computing device 220 as listed in the left column of FIG. 3 under the heading "BROWSING DEVICE". Some acts are performed by the source computing device 210 as listed in the right column of FIG. 3 under the heading "SOURCE DEVICE". Other acts are performed cooperatively by both the source computing device 210 and the browsing computing device as listed in the middle column of FIG. 3 under the heading "BOTH".

Figure 4:
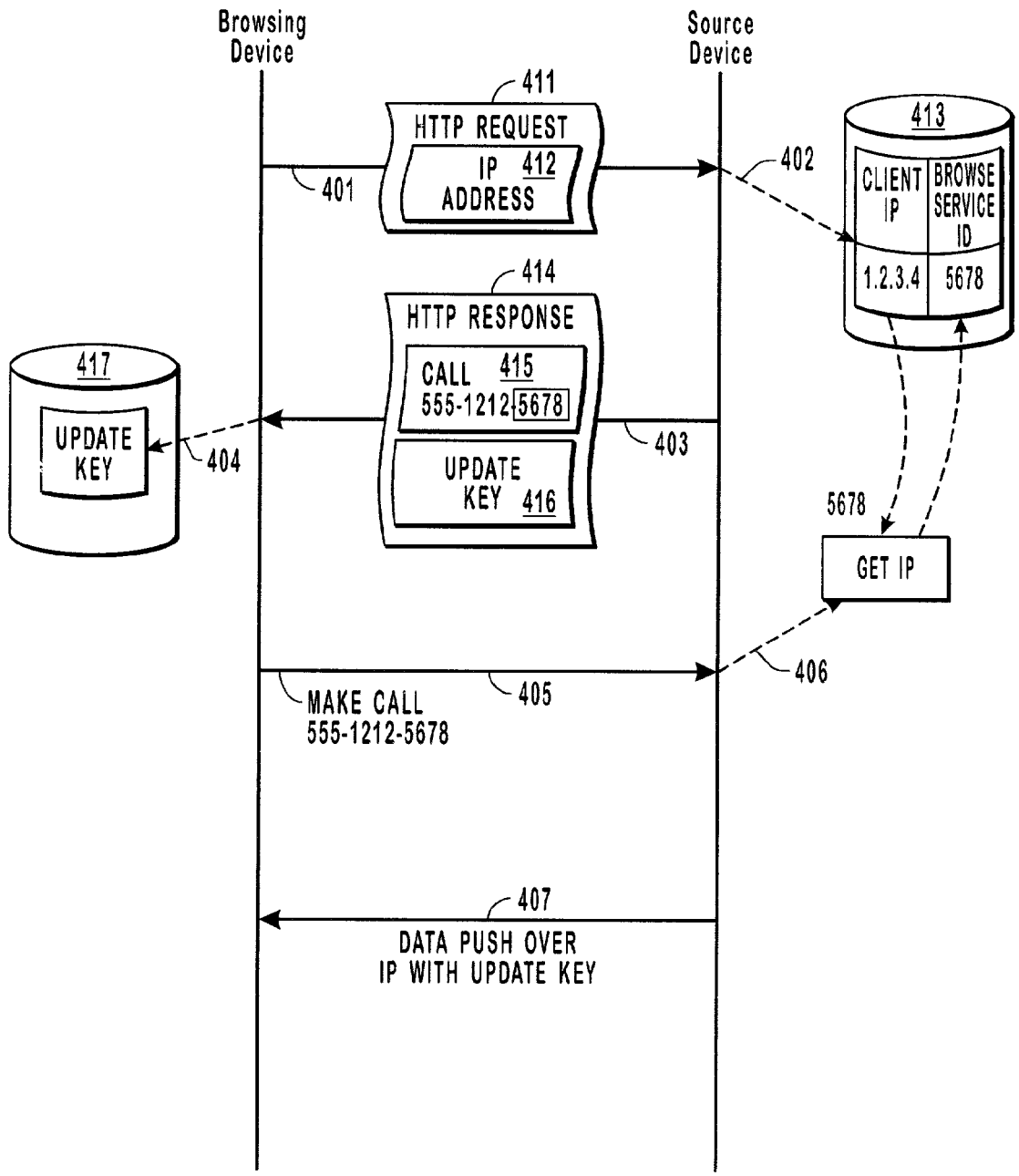
FIG. 4 illustrates an example data flow in accordance with the method of FIG. 3.

FIG. 4 illustrates an example data flow that is in accordance with the method of FIG. 3, but which represents a mere example of an embodiment of the present invention. The following discussion of FIG. 3 will make frequent reference to the example of FIG. 4.

The method 300 is initiated by establishing a first data channel between the source computing device 210 and the browsing computing device 220 (act 301). The data channel may be any channel that may be used to communicate data (e.g., Web pages, emails, script, or the like), but is not capable of facilitating a two-way real time voice conversation. Such data channels may be defined by currently existing technology or technology to be developed in the future. Such data channels may even be supported by stateless protocols such as HyperText Transport Protocol (HTTP) in which each HTTP request is typically responded to independent of any previous HTTP request. The data channels and voice channels may even use the same underlying transport. For example, HTTP over Internet Protocol (IP) may be used for the data channel, while IP telephony over IP may be used for the voice channel.

FIG. 4 illustrates an example in which the data channel is established via HTTP. In particular, arrow 401 shows that an HTTP request 411 that includes a return Internet Protocol (IP) address 412 may be transmitted from the browsing computing device to the source computing device. This transmission may occur using conventional HTTP technology over a conventional IP network. The source computing device may then use the IP address 412 to return a response to the address. Accordingly, the transmission of such an HTTP request establishes a logical data channel between the browsing computing device and the source computing device. The establishment of the first data channel (act 301) is listed in the middle column of FIG. 3 under the heading "BOTH" since often data channels are established through cooperative interaction between the two computing devices that are to be connected, although that is not always the case.

The method 300 also includes a step for establishing a voice channel with an entity associated with the source computing device in a manner that allows the source computing device to establish a second data channel with the browsing computing device and correlate the voice channel with the second data channel (step 316). This may include any corresponding acts for accomplishing that result-oriented function. However, in the illustrated example of FIG. 3, this step 316 includes corresponding acts 302 and 307 through 310.

In particular, the browsing computing device transmits one or more communications over the first data channel to the source computing device, at least one of the one or more communications including a data address of the browsing computing device (act 302). There is no requirement that the data address be communicated after the data channel is established in act 301. Acts 301 and 302 may occur concurrently as well. For example, in the example of FIG. 4, the one or more communications from the browsing computing device includes the single HTTP request 411 that was used to establish the data channel. In that sense, the single HTTP request 411 is used to establish the data channel as well as to inform the source computing device of the data address.

The source computing device receives the one or more communications over the first data channel from the browsing computing device (act 303), reads the data address of the browsing computing device (act 304), and then correlates the data address with an identifier that may be communicated over a voice channel (act 305). Referring to the specific example of FIG. 4, the reading and correlation acts are illustrated by arrow 402 in which the browser IP address (e.g., 1.2.3.4) is stored to a memory 413, and correlated with a browse session identifier (e.g., 5678) that can be communicated over a voice channel.

Telephony Application Programming Interface (TAPI) allows for telephone users to communicate information over a regular telephone line by using distinct tones called "DTMF" tones for each key on a telephone dialing pad. For example, when a user dials a "3", one specific tone is emitted over the telephone connection. When the user dials a "7", another specific tone is emitted. Accordingly, an identifier that includes numbers (e.g., 5678) may be communicated over a voice channel such as a telephone connection once the telephone number has been dialed to create the telephone connection.

The source computing device then transmits a calling mechanism over the first data channel to the browsing computing device (act 306). The calling mechanism facilitates establishment of a voice channel with an entity associated with the source computing device. The calling mechanism references the identifier correlated with the data address of the browsing computing device.

For example, as represented by the arrow 403 of FIG. 4, the source computing device may return an HTTP response 414 by first securing the data channel via, for example, Secure Sockets Layer (SSL) protocol. The calling mechanism may be a HyperText Markup Language (HTML) hyperlink 415 that, when selected, causes a telephone mechanism to dial a particular number associated with the calling hyperlink. Such calling hyperlinks are known to one of ordinary skill in the art. However, instead of associating just a simple telephone number (e.g., 555-1212) with the calling hyperlink, a suffix that represents the identifier (e.g., 5678) may be appended to the end of the telephone number. Alternatively, the calling mechanism may include a calling hyperlink that includes just the telephone number, along with an instruction to wait for a dial tone (or wait a specified period of time within which a dial tone could be expected), and then enter the browse session identifier using DTMF tones. This latter alternative is useful in many newer networks in which simply appending a number to a telephone number when dialing is not sufficient to guarantee that the appended number will be dialed after the voice connection is established.

The calling mechanism may also include an update key 416 that represents authorization to update the display of the browsing computing device. Should a remote computing device such as the source computing device provide the update key in a future communication over a subsequently established data channel, the browsing computing device may recognize the update authorization, and comply with the remotely issued update instructions. The browsing computing device stores the update key 416 in memory 417 as represented by arrow 404 of FIG. 4.

After the browsing computing device receives the calling mechanism over the first data channel (act 307), the browsing computing device may receive a user selection of the calling mechanism. For example, if the calling mechanism was a calling hyperlink, the user may move the mouse pointer over the calling hyperlink, and then select with the mouse button. In response to the user selection of the calling mechanism, the browsing computing device automatically generates a request that includes information that the source computing device may use to determine a data address of the browsing computing device (act 309). Such information may include the browse session identifier. The browsing computing device then transmits the request to the source computing device over the voice channel (act 310).

For example, with respect to FIG. 4, the generation and transmission of the request over the voice channel is initiated by a user selecting the calling hyperlink 415. This would cause the browsing computing device to dial 555-1212-5678. The telephone number portion (i.e., 555-1212) would establish a connection, while the identifier portion (i.e., 5678) would be dialed after the telephone connection was established with the entity associated with the source computing device. This telephone call is represented by arrow 405 of FIG. 4.

After the source computing device receives the request that includes the identifier (act 311), the source computing device identifies the data address of the browsing computing device based on the browse session identifier (act 312). Referring to the example of FIG. 4, the source computing device may identify the data address (e.g., 1.2.3.4) by using the browse session identifier (e.g., 5678) and the previous correlation made in act 305. The process of finding the data address is represented by the arrow 406 of FIG. 4.

With this data address, the source computing device may establish a second data channel with the browsing computing device (act 313) using, for example, HTTP. This act is listed in the middle column of FIG. 3 under the heading "BOTH" since often data connections are established through cooperative interaction between the two computing devices that are to be connected, although that is not always the case.

The source computing device may then submit update requests to the browsing computing device (act 314). The updates may be accompanied by the appropriate update key. One a given browser update request is received at the browsing computing device (act 315), the browsing computing device may optionally compare the update key received with the update request with the stored update key. If a match is found, the display is updated accordingly.

The source computing device may update its own browser in accordance with the update requests as well. Accordingly, the displays of the browsing and source computing devices may match. As mentioned previously, the browsing computing device may also be a source computing device, and vice versa. Accordingly, the browsing computing device 220 may potentially also update the display of the source computing device 210 over the same data connection that is used by the source computing device 210 to update the display of the browsing computing device 220. As previously described, the update key may be used by the source computing device 210 to update the browser display of the browsing computing device 220. However, in order to facilitate two-way browser updates over the same data channel, the update key may be symmetric thus representing authorization for the browsing computing device 220 to update the browser display of the source computing device 210 as well.

In accordance with the principles of the present invention, a telephone conversation could be simultaneously occurring between the user of the browsing computing device and an entity associated with the source computing device over the voice channel. Also, the initial connection through the data channel allowed the source computing device to correlate a voice channel with a subsequently established data channel via the assignment of a browse session identifier, and the inclusion of the browse session identifier in the calling mechanism.

The principles of the present invention enable a wide variety of useful scenarios as will be apparent to those of ordinary skill in the art after having reviewed this description. For example, suppose that the user of the browsing computing device desires to plan a trip to Turkey. The user may browse to a Web site of a travel agency using a first data channel. The home Web page of the travel agency may include a call hyperlink that allows the user to call one of the travel agents associated with the travel agency. The user selects the call link and starts talking to a travel agent over a voice channel. The travel agent then updates the user's browser as well as her own browser so that they both see available ticket options. They continue updating the browsers and conversing over the telephone until the user has selected the ticket, identified a desired hotel room, and the like, all as though the travel agent and the user of the browsing computing device were side-by-side looking at the same screen.

Furthermore, unlike conventional voice-to-data technology. The data-voice-data technology described herein allows convenient correlation of the voice channel to the second data channel using exchanges that occur within the first data channel. Accordingly, the present invention allows for convenient and efficient integration of voice and data channels to allows for simultaneous exchange of voice and data information.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network that includes a browsing computing device and a source computing device, the browsing computing device being network connectable to the source computing device using a data channel as well as to an entity associated with the source computing device via a voice channel, a method for the browsing computing device to facilitate an integrated voice/data communication with the source computing device, the method comprising the following:

an act of establishing a first data channel with a source computing device;

an act of transmitting one or more communications over the first data channel to the source computing device, at least one of the one or more communications including a data address of the browsing computing device;

an act of receiving a calling mechanism over the first data channel, the calling mechanism facilitating establishment of a voice channel with an entity associated with the source computing device;

an act of receiving a user selection of the calling mechanism;

in response to the user selection of the calling mechanism, an act of automatically generating a request that includes information that the source computing device may use to determine a data address that corresponds to the browsing computing device, the data address being different from the voice channel address that corresponds to the browsing computing device;

an act of transmitting the request to the source computing device over the voice channel;

an act of establishing a second data channel with the source computing device; and an act of receiving information from the source computing device over the second data channel.

2. A method in accordance with claim 1, wherein the act of receiving a calling mechanism over the first data channel comprises the following:

an act of receiving a calling mechanism that references all identifier that the source computing device may correlate to the data address of the browsing computing device.

3. A method in accordance with claim 2, wherein the act of automatically generating a request that includes information that the source computing device may use to determine a data address that corresponds to the browsing computing device comprises the following:

an act of automatically generating a request that includes the identifier.

4. A method in accordance with claim 1, wherein the act of transmitting one or more communications over the first data channel to the source computing device comprises the following:

an act of submitting a HyperText Transport Protocol (HTTP) request to the source computing device, the HTTP address including the data address of the browsing computing device.

5. A method in accordance with claim 4, wherein the act of receiving a calling mechanism over the first data channel comprises the following:

an act of receiving an HTTP response to the HTTP request, wherein the calling mechanism is included in the HTTP response.

6. A method in accordance with claim 1, further comprising the following:

an act of receiving an update key over the first data channel, the update key representing authorization to update a display of the browsing computing device; and wherein the act of receiving information from the source computing device over the second data channel comprises the following:

an act of receiving the update key over the second data channel.

7. A method in accordance with claim 6, further comprising the following:

an act of determining that the update key authorizes the source computing system to update the display of the browsing computing device; and an act of updating the display to reflect the receipt of the information received over the second data channel.

8. In a computer network that includes a browsing computing device and a source computing device, the browsing computing device being network connectable to the source computing device using a data channel as well as to an entity associated with the source computing device via a voice channel, a method for the browsing computing device to facilitate an integrated voice/data communication with the source computing device, the method comprising the following:

an act of establishing a first data channel with a source computing device;

a step for establishing a voice channel with an entity associated with the source computing device in a manner that allows the source computing device to establish a second data channel with the browsing computing device and correlate the voice channel with the second data channel;

an act of receiving information from the source computing device over the second data channel;

an act of transmitting one or more communications over the first data channel to the source computing device, at least one of the one or more communications including a data address of the browsing computing device; an act of receiving a calling mechanism over the first data channel, the calling mechanism facilitating establishment of a voice channel with an entity associated with the source computing device; an act of receiving a user selection of the calling mechanism; in response to the user selection of the calling mechanism, an act of automatically generating a request that includes information that the source computing device may use to determine a data address that corresponds to the browsing computing device, the data address being different from the voice channel address that corresponds to the browsing computing device; an act of transmitting the request to the source computing device over the voice channel; and an act of establishing a second data channel with the source computing device.

9. A method in accordance with claim 8, wherein the act of receiving a calling mechanism over the first data channel comprises the following:

an act of receiving a calling mechanism that references an identifier that the source computing device may map to the data address of the browsing computing device.

10. A method in accordance with claim 8, wherein the act of transmitting one or more communications over the first data channel to the source computing device comprises the following:

an act of submitting a HyperText Transport Protocol (HTTP) request to the source computing device, the HTTP address including the data address of the browsing computing device.

11. A method in accordance with claim 10, wherein the act of receiving a calling mechanism over the first data channel comprises the following:
an act of receiving an HTTP response to the HTTP request, wherein the calling mechanism is included in the HTTP response.

12. A method in accordance with claim 8, further comprising the following:
an act of receiving an update key over the first data channel, the update key representing authorization to update a display of the browsing computing device; and wherein the act of receiving information from the source computing device over the second data channel comprises the following:
an act of receiving the update key over the second data channel.

13. A method in accordance with claim 12, further comprising the following:
an act of determining that the update key authorizes the source computing system to update the display of the browsing computing device; and
an act of updating the display of the browser to reflect the receipt of the information received over the second data channel.

14. A computer program product for use in a computer network that includes a browsing computing device and a source computing device, the browsing computing device being network connectable to the source computing device using a data channel as well as to an entity associated with the source computing device via a voice channel, the computer program product for implementing a method for the browsing computing device to facilitate an integrated voice/data communication with the source computing device, the computer program product comprising one or more computer-readable media having stored thereon the following:
computer-executable instructions for causing a first data channel to be established with a source computing device;
computer-executable instructions for causing one or more communications to be transmitted over the first data channel to the source computing device, at least one of the one or more communications including a data address of the browsing computing device;
computer-executable instructions for detecting the receipt of a calling mechanism over the first data channel, the calling mechanism facilitating establishment of a voice channel with an entity associated with the source computing device;
computer-executable instructions for detecting the receipt of a user selection of the calling mechanism;
computer-executable instructions for automatically generating a request in response to the user selection of the mechanism, the request including information that the source computing device may use to determine a data address that corresponds to the browsing computing device, the data address being different from the voice channel address that corresponds to the browsing computing device;
computer-executable instructions for causing the request to be transmitted to the source computing device over the voice channel; and
computer-executable instructions causing a second data channel to be established with the source computing device; and
computer-executable instructions for detecting the receipt of information over the second data channel.

15. A computer program product in accordance with claim 14, wherein the one or more computer-readable media are physical storage media.

16. A computer program product in accordance with claim 14, wherein the computer-executable instructions for detecting the receipt of a calling mechanism over the first data channel comprise the following:
computer-executable instructions for detecting the receipt of a calling mechanism that references an identifier that the source computing device may map to the data address of the browsing computing device.

17. A computer program product in accordance with claim 16, wherein the computer-executable instructions for automatically generating a request that includes information that the source computing device may use to determine a data address that corresponds to the browsing computing device comprise the following:
computer-executable instructions for automatically generating a request that includes the browse session identifier.

18. A computer program product in accordance with claim 14, wherein the one or more computer-readable media further have stored thereon the following:
computer-executable instructions for detecting the receipt of an update key over the first data channel, the update key representing authorization to update a display of the browsing computing device; wherein the computer-executable instructions for detecting the receipt of information from the source computing device over the second data channel comprise the following:
computer-executable instructions for detecting the receipt of the update key over the second data channel.

19. A computer program product in accordance with claim 18, wherein the one or more computer-readable media further have stored thereon the following:
computer-executable instructions for determining that the update key authorizes the source computing system to update the display of the browsing computing device; and
computer-executable instructions for causing the display to be updated to reflect the receipt of the information received over the data channel.

20. In a computer network that includes a browsing computing device and a source computing device that hosts a network site, the browsing computing device being network connectable to the source computing device using a data channel as well as to an entity associated with the source computing device via a voice channel, a method for the source computing device to facilitate an integrated voice/data communication with the browsing computing device, the method comprising the following:
an act of establishing a first data channel with a browsing computing device;
an act of receiving one or more communications over the first data channel from the browsing computing device, the one or more communications including a data address of the browsing computing device;
an act of reading the data address of the browsing computing device from at least one of the one or more communications received from the browsing computing device over the first data channel;
an act of correlating the data address with an identifier that may be communicated over a voice channel;
an act of transmitting a calling mechanism over the first data channel to the browsing computing device, the calling mechanism facilitating establishment of a voice channel with an entity associated with the source computing device, the calling mechanism referencing the identifier correlated with the data address of the browsing computing device;

an act of receiving a request from the browsing computing device over a voice channel, the request including the browse session identifier;

an act of identifying the data address of the browsing computing device based on the identifier;

an act of establishing a second data channel with the browsing computing device using the data address identified using the identifier; and an act of transmitting information to the browsing computing device over the second data channel.

21. A method in accordance with claim 20, wherein the act of transmitting a calling mechanism over the first data channel comprises the following:

an act of transmitting a calling mechanism that references an identifier that the source computing device may correlate to the data address of the browsing computing device.

22. A method in accordance with claim 20, further comprising the following:

an act of transmitting an update key to the browsing computing device over the first data channel, the update key representing authorization to update a display of the browsing computing device.

23. A method in accordance with claim 22, wherein the act of transmitting information to the browsing computing device over the second channel comprises the following:

an act of transmitting the update key to the browsing computing device over the second data channel.

24. A computer program product for use in a computer network that includes a browsing computing device and a source computing device that hosts a network site, the browsing computing device being network connectable to the source computing device using a data channel as well as to an entity associated with the source computing device via a voice channel, the computer program product for implementing a method for the source computing device to facilitate an integrated voice/data communication with the browsing computing device, the computer program product comprising one or more computer-readable media having stored thereon the following:

computer-executable instructions for causing a first data channel to be established with a browsing computing device;

computer-executable instructions for detecting the receipt of one or more communications over the first data channel from the browsing computing device, the one or more communications including a data address of the browsing computing device;

computer-executable instructions for reading the data address of the browsing computing device from at least one of the one or more communications received from the browsing computing device over the first data channel;

computer-executable instructions for correlating the data address with an identifier that may be communicated over a voice channel;

computer-executable instructions for causing the calling mechanism to be transmitted over the first data channel to the browsing computing device, the calling mechanism facilitating establishment of a voice channel with an entity associated with the source computing device, the calling mechanism referencing the identifier correlated with the data address of the browsing computing device;

computer-executable instructions for detecting the receipt of a request from the browsing computing device over a voice channel, the request including the browse session identifier;

computer-executable instructions for identifying the data address of the browsing computing device based on the identifier;

computer-executable instructions for establishing a second data channel with the browsing computing device using the data address identified using the identifier; and computer-executable instructions for causing information to be transmitted to the browsing computing device over the second data channel.

25. A computer program product in accordance with claim 24, wherein the one or more computer-readable media are physical storage media.

26. A computer program product in accordance with claim 24, wherein the computer-executable instructions for causing a calling mechanism to be transmitted over the first data channel comprise the following:

computer-executable instructions for causing a calling mechanism to be transmitted to the browsing computing system, the calling mechanism referencing an identifier that the source computing device may map to the data address of the browsing computing device.

27. A computer program product in accordance with claim 24, wherein the one or more computer-executable instructions further have stored thereon the following:

computer-executable instructions for causing an update key to be transmitted to the browsing computing device over the first data channel, the update key representing authorization to update a display of the browsing computing device.

28. A computer program product in accordance with claim 24, wherein the computer-executable instructions for causing the information to be transmitted to the browsing computing device over the second channel comprise the following:

computer-executable instructions for causing the update key to be transmitted to the browsing computing device over the second data channel.

* * * * *